United States Patent [19]

St. Pierre

[11] Patent Number: 4,744,475
[45] Date of Patent: May 17, 1988

[54] FREE-STANDING DISPLAY ASSEMBLY

[75] Inventor: René St. Pierre, Chatealguay, Canada

[73] Assignee: Roll-It, Inc., Lachine, Canada

[21] Appl. No.: 14,862

[22] Filed: Feb. 17, 1987

[51] Int. Cl.⁴ ............................................. A47B 57/58
[52] U.S. Cl. ..................................... 211/134; 211/182; 211/189; 403/240; 403/347; 403/329; 108/111
[58] Field of Search ............... 211/134, 182, 186, 187, 211/192, 190, 189, 206, 183; 403/240, 347, 329; 248/165, 558; 108/107, 111, 153

[56] References Cited

U.S. PATENT DOCUMENTS

| | | | |
|---|---|---|---|
| 1,733,868 | 10/1929 | Durell | 211/134 X |
| 1,769,127 | 7/1930 | Finnegan | 403/329 X |
| 3,160,281 | 12/1964 | Ruhnke | 211/189 |
| 3,472,476 | 10/1969 | Johnson | 211/134 X |
| 3,484,068 | 12/1969 | Yoder | 211/189 X |
| 3,502,292 | 3/1970 | Yoder | 211/189 X |
| 4,423,817 | 1/1984 | Monjo-Rufi | 211/192 X |

FOREIGN PATENT DOCUMENTS 571293  5/1924  France ................ 403/240

Primary Examiner—Ramon S. Britts
Assistant Examiner—Karen J. Chotkowski
Attorney, Agent, or Firm—Fishman, Dionne & Cantor

[57] ABSTRACT

At least one post member of the assembly is receivable by the base member of the assembly through an opening in the top wall of the base member. Cam means are mounted on the inner surface of the outer wall of the base member in alignment with the opening for detachably connecting the post member to the base member when the post member extends through the opening to the bottom wall.

6 Claims, 2 Drawing Sheets

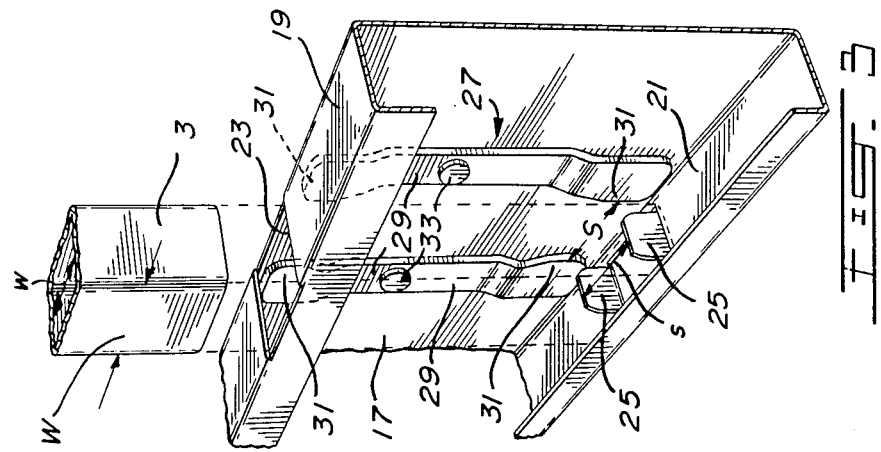
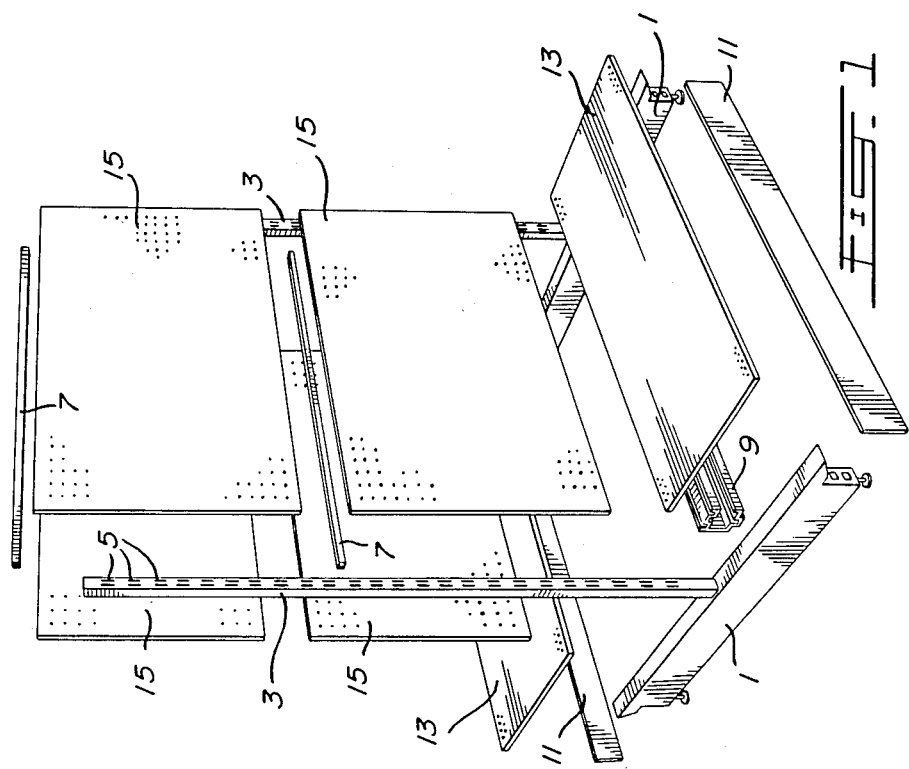

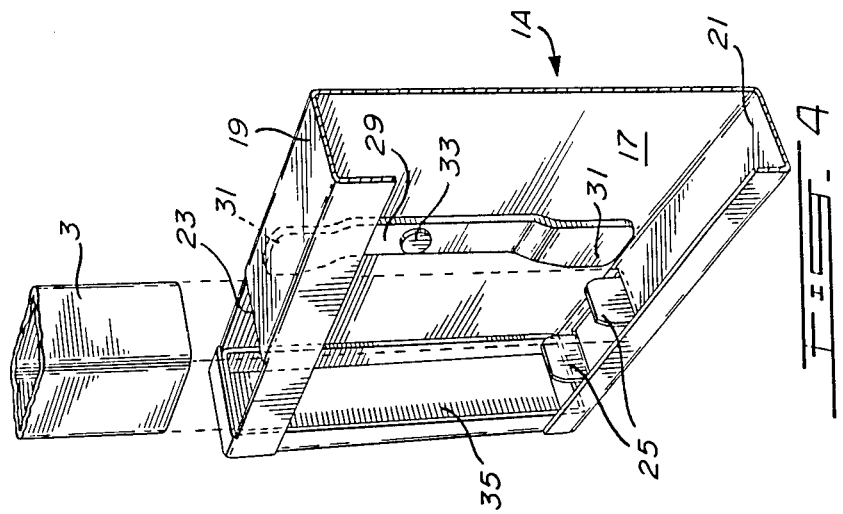
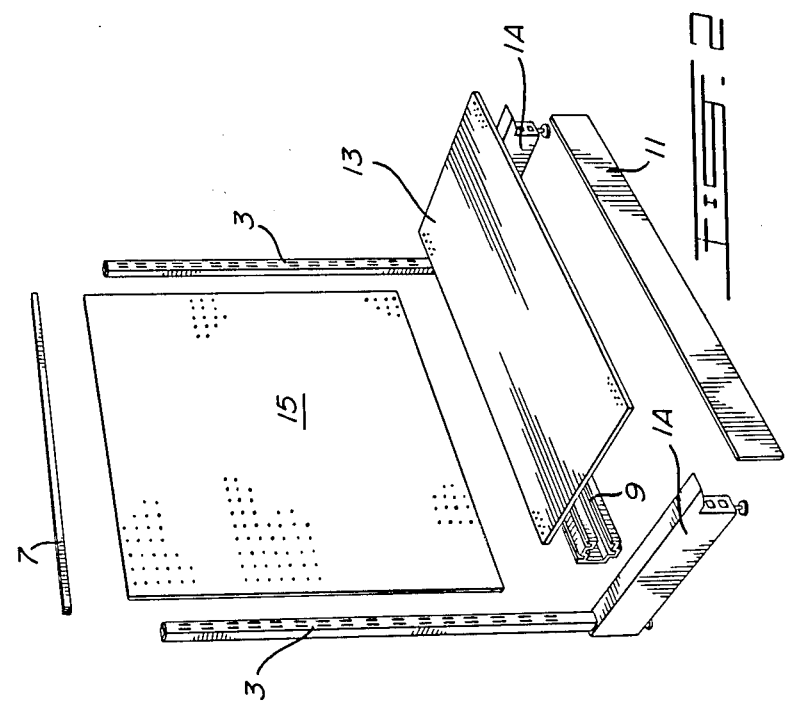

FREE-STANDING DISPLAY ASSEMBLY

BACKGROUND OF THE INVENTION

1. Field of the Invention

The invention relates to a free-standing display assembly commonly referred to as a gondola display. More specifically, the invention relates to a knock-down such assembly and including a novel structure for detachably connecting the post of the assembly to respective ones of the bases of the assembly.

2. Description of Prior Art

Gondola assemblies are known in the art as illustrated in, for example, U.S. Pat. Nos. 3,127,020, Bibb, Mar. 31, 1964, 3,601,432, Fenwick et al, Aug. 24, 1971, 3,960,275, Haughton et al, June 1, 1976, 4,380,298, Harig, Apr. 19, 1983, and U.S. Pat. No. 4,426,011, Jay, Jan. 17, 1984. One of the requirements of such assemblies is that the posts must be securely and rigidly fixed to the base as the posts are load carrying members. A conflicting requirement is that the assembly be easily assembled so that it can be shipped in its knock-down, rather than assembled, condition. The second requirement is conflicting with the first in that, in order to provide a secure and rigid connection, in accordance with available assemblies, special tools or procedures are required which of course opposes easy assembly. Thus, if bolts are used to fix the post to the bases, special tools may be needed for tightening the bolts. In any case, the bolts must be shipped with the post and base and can be lost in transit. Finally, when using bolts, the holes must be pre-aligned with fine tolerances.

In some instances, the posts are fixed to the bases by welding. This, of course, requires special tools and special procedures.

In the '020 patent above-referred to, a wedging block 35 deforms the bottom part of post 11 to fix it in a pocket 19 of base 15. The block is held in place by a bolt 42. This has the disadvantages above-referred to when using bolts for fixing the post to the base.

In the '432 patent, as described at column 1, lines 69 to 73 of the patent, hooks on the base are inserted into slots of the posts. This arrangement would not provide the security and rigidity required.

In the '275 patent and in the '011 patent, the posts are fixed to the bases by machine bolts, which has the disadvantages above-referred to. In the '298 patent, an interference fit is employed. A strap member 36 extends vertically upward from each base member, and clips 47 and 48 extend inwardly from the strap. The hollow post is slid over the strap and clip arrangement. The clips, in effect, act as retaining springs.

SUMMARY OF INVENTION

It is an object of the invention to provide a novel structure for detachably connecting the posts of gondola displays to respective ones of the bases thereof.

It is a further object of the invention to provide a camming arrangement for effecting the connection.

In accordance with the invention, each base of the gondola display comprises an outer wall, a top wall and a bottom wall. An opening is provided in the top wall for receiving a respective post. Cam means are mounted on the inner surface of the outer wall in alignment with the opening for detachably connecting the post member to the base member when the post member extends through the opening to the bottom wall.

BRIEF DESCRIPTION OF DRAWINGS

The invention will be better understood by an examination of the following description, together with the accompanying drawings, in which:

FIG. 1 is an exploded view of a full gondola display;
FIG. 2 is an exploded view of an end gondola display;
FIG. 3 illustrtes the structure for detachably connecting a post to the base in the full gondola display; and
FIG. 4 illustrates the structure for connecting the post to the base in the end gondola display.

DESCRIPTION OF PREFERRED EMBODIMENTS

Referring to the drawings, each gondola display includes one or more bases 1 each of which receives a respective post 3 each having receiving slots 5.

Tie bars 7 may provide horizontal connections for the posts and also provide spacers for the posts, and a bridge 9 is connected between the bases both to add structural strength to the arrangement and to space the bases by a predetermined distance. Kick plates 11 are provided to finish the display, and shelves 13 may be used for storing display merchandise in a retail outlet. Display boards 15 can be mounted on one or both sides of the posts.

The end gondola display includes the same parts as the full gondola display except that the bases 1A in the end gondola display are only half the bases of the full gondola display.

Turning now to FIGS. 3 and 4, each base 1 and 1A includes an outer wall 17, a top wall 19 and a bottom wall 21. Opening 23 in the top walls is provided for receiving the post 3 therethrough. Tabs 25 on the bottom wall are disposed vertically upward and are spaced from each other by a distance s which is just slightly greater than the distance w between the inner surfaces of the walls of the posts as illustrated in FIG. 3.

Mounted on the inner surface of the outer wall and in alignment with the opening 23 are camming means 27. The camming means for the full gondola comprise two elongated members 29 having inwardly facing fingers 31 disposed at either end thereof. The elongated members are pivotable about a pivot point 33.

As can be seen in FIG. 4, only such a single elongated member is needed in the end gondola display.

The spacing S between the facing ends of the fingers 31 is slightly less than the dimension W of the post 3 as shown in FIG. 3.

In operation, the lower fingers are pivoted towards each other, or, in the end gondola, towards the end wall 35 so that the post, after passing through the opening 23, is unencumbered by the upper fingers 31 in its passage towards the bottom wall 21. When the post reaches the lower fingers 31, it will push them outwardly so that the upper fingers 31 will be moved inwardly towards each other. The post is then tapped in to be force-fitted onto the tabs 25 and, because of the positioning of the elongated members, and especially the fingers 31 thereof, the fingers 31 will grasp the post at the top and bottom of the elongated members to thereby securely and rigidly connect the post to the base. It is, of course, also possible to detach the post from the base as the post is neither bolted nor welded to the base.

Although particular embodiments have been described, this was for the purpose of illustrating, but not limiting, the invention. Various modifications, which will come readily to the mind of one skilled in the art, are within the scope of the invention as defined in the appended claims.

I claim:

1. A free-standing display assembly comprising:
   at least one post member, said post member having an outer surface width;
   at least one base member having an outer wall, a top wall and a bottom wall;
   an opening in said top wall for receiving said post therethrough; and
   cam means on the inner surface of said outer wall in alignment with said opening for detachably connecting said post member to said base member when said post member extends through said opening to said bottom wall;
   said cam means comprising an elongated member having a finger at each end thereof, said fingers being pointed, in operation, at said post member;
   said cam means further including pivoting means at a point between the ends thereof;
   wherein, when said post member extends through said opening to said bottom wall, said elongated member pivots to detachably connect said post member to said base member.

2. An assembly as defined in claim 1 wherein said cam means extend on either side of said opening.

3. An assembly as defined in claim 2 wherein the spacings between said fingers are slightly less than the width of post member.

4. An assembly as defined in claim 3 wherein said post member comprises a tubular member having an inner surface width;
   tab means extending upwardly from said bottom wall in alignment with said opening;
   the spacing between said tab means being slightly larger than said inner surface width.

5. An assembly as defined in claim 1 wherein said base member includes an end wall at one end thereof;
   said end wall being disposed on one side of said opening;
   said camming means being disposed on the other side of said opening.

6. An assembly as defined in claim 1 wherein said post member comprises a tubular member having an inner surface width;
   tab means extending upwardly from said bottom wall in alignment with said opening;
   spacing between said tab means being slightly larger than said inner surface width.

* * * * *